United States Patent
Park et al.

(10) Patent No.: US 9,912,493 B2
(45) Date of Patent: Mar. 6, 2018

(54) HOME NETWORK SIGNAL RELAY DEVICE IN ACCESS NETWORK AND HOME NETWORK SIGNAL RELAY METHOD IN ACCESS NETWORK USING SAME

(71) Applicant: KT CORPORATION, Gyeonggi-do (KR)

(72) Inventors: Nowook Park, Gyeonggi-do (KR); Jeong-Hwi Kim, Seoul (KR); Hyung-Jin Park, Seoul (KR); In-Taek Jeong, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 18 days.

(21) Appl. No.: 15/024,019

(22) PCT Filed: May 19, 2014

(86) PCT No.: PCT/KR2014/004462
§ 371 (c)(1),
(2) Date: Mar. 22, 2016

(87) PCT Pub. No.: WO2015/046701
PCT Pub. Date: Apr. 2, 2015

(65) Prior Publication Data
US 2016/0241417 A1    Aug. 18, 2016

(30) Foreign Application Priority Data
Sep. 24, 2013 (KR) .......................... 10-2013-0113430

(51) Int. Cl.
*H04J 14/02* (2006.01)
*H04L 12/28* (2006.01)
(Continued)

(52) U.S. Cl.
CPC ............ *H04L 12/2834* (2013.01); *H04B 3/36* (2013.01); *H04B 10/29* (2013.01); *H04J 14/00* (2013.01); *H04L 12/2838* (2013.01)

(58) Field of Classification Search
CPC .. H04B 10/29; H04B 10/27; H04B 10/25751; H04B 10/075; H04B 3/36
(Continued)

(56) References Cited

U.S. PATENT DOCUMENTS

| 6,226,680 B1 | 5/2001 | Boucher et al. |
| 6,247,060 B1 | 6/2001 | Boucher et al. |

(Continued)

FOREIGN PATENT DOCUMENTS

| EP | 1235433 A2 | 8/2002 |
| EP | 2315395 A1 | 4/2011 |

(Continued)

OTHER PUBLICATIONS

European Patent Office, European Search Report of corresponding European Patent Application No. 4846969.5, Apr. 21, 2017.

*Primary Examiner* — Don N Vo
(74) *Attorney, Agent, or Firm* — IP Legal Services, LLC (57) ABSTRACT

Provided is a method for converting an optical signal into a home network signal to transmit it in a home network signal relay device. The method includes: receiving an optical signal via an optical cable and converting the received optical signal to an Ethernet signal; classifying and storing the converted Ethernet signal according to a type of data; converting a frame of the stored Ethernet signal to a frame of a home network signal; and distributing the converted home network signal to one or more relay terminals or user terminals via transmission lines.

10 Claims, 6 Drawing Sheets

(51) Int. Cl.
*H04B 3/36* (2006.01)
*H04B 10/29* (2013.01)
*H04J 14/00* (2006.01)

(58) Field of Classification Search
USPC .......................................................... 398/97
See application file for complete search history.

(56) References Cited

U.S. PATENT DOCUMENTS

| | | |
|---|---|---|
| 6,389,479 B1 | 5/2002 | Boucher et al. |
| 6,427,171 B1 | 7/2002 | Craft et al. |
| 6,427,173 B1 | 7/2002 | Boucher et al. |
| 6,434,620 B1 | 8/2002 | Boucher et al. |
| 6,470,415 B1 | 10/2002 | Starr et al. |
| 6,807,581 B1 | 10/2004 | Starr et al. |
| 8,621,101 B1 | 12/2013 | Starr et al. |
| 2001/0021949 A1 | 9/2001 | Blightman et al. |
| 2001/0023460 A1 | 9/2001 | Boucher et al. |
| 2001/0027496 A1 | 10/2001 | Boucher et al. |
| 2001/0036196 A1 | 11/2001 | Blightman et al. |
| 2001/0037397 A1 | 11/2001 | Boucher et al. |
| 2001/0037406 A1* | 11/2001 | Philbrick ............... H04L 29/06 709/250 |
| 2001/0047433 A1 | 11/2001 | Boucher et al. |
| 2002/0063924 A1 | 5/2002 | Kimbrough et al. |
| 2002/0087732 A1 | 7/2002 | Boucher et al. |
| 2002/0091844 A1 | 7/2002 | Craft et al. |
| 2002/0095519 A1 | 7/2002 | Philbrick et al. |
| 2002/0147839 A1 | 10/2002 | Boucher et al. |
| 2002/0156927 A1 | 10/2002 | Boucher et al. |
| 2002/0161919 A1 | 10/2002 | Boucher et al. |
| 2003/0079033 A1 | 4/2003 | Craft et al. |
| 2003/0140124 A1 | 7/2003 | Burns |
| 2003/0167346 A1 | 9/2003 | Craft et al. |
| 2004/0003126 A1 | 1/2004 | Boucher et al. |
| 2004/0030745 A1 | 2/2004 | Boucher et al. |
| 2004/0054813 A1 | 3/2004 | Boucher et al. |
| 2004/0062246 A1 | 4/2004 | Boucher et al. |
| 2004/0064590 A1 | 4/2004 | Starr et al. |
| 2004/0073703 A1 | 4/2004 | Boucher et al. |
| 2004/0078462 A1 | 4/2004 | Philbrick et al. |
| 2004/0078480 A1 | 4/2004 | Boucher et al. |
| 2004/0100952 A1 | 5/2004 | Boucher et al. |
| 2004/0111535 A1 | 6/2004 | Boucher et al. |
| 2004/0117509 A1 | 6/2004 | Craft et al. |
| 2004/0158640 A1 | 8/2004 | Philbrick et al. |
| 2004/0158793 A1 | 8/2004 | Blightman et al. |
| 2004/0240435 A1 | 12/2004 | Boucher et al. |
| 2005/0071490 A1 | 3/2005 | Craft et al. |
| 2005/0141561 A1 | 6/2005 | Craft et al. |
| 2005/0144300 A1 | 6/2005 | Craft et al. |
| 2005/0160139 A1 | 7/2005 | Boucher et al. |
| 2005/0175003 A1 | 8/2005 | Craft et al. |
| 2005/0198198 A1 | 9/2005 | Craft et al. |
| 2005/0204058 A1 | 9/2005 | Philbrick et al. |
| 2005/0278459 A1 | 12/2005 | Boucher et al. |
| 2006/0010238 A1 | 1/2006 | Craft et al. |
| 2006/0075130 A1 | 4/2006 | Craft et al. |
| 2006/0083253 A1 | 4/2006 | Park et al. |
| 2006/0203844 A1 | 9/2006 | Knittle et al. |
| 2007/0067497 A1 | 3/2007 | Craft et al. |
| 2007/0118665 A1 | 5/2007 | Philbrick et al. |
| 2007/0130356 A1 | 6/2007 | Boucher et al. |
| 2007/0136495 A1 | 6/2007 | Boucher et al. |
| 2008/0126553 A1 | 5/2008 | Boucher et al. |
| 2009/0016718 A1* | 1/2009 | Lubin ............... H04B 10/25753 398/58 |
| 2009/0086732 A1 | 4/2009 | Boucher et al. |
| 2010/0166125 A1 | 7/2010 | Mezer |
| 2011/0091025 A1 | 4/2011 | Francisco |
| 2011/0280243 A1 | 11/2011 | Boucher et al. |
| 2012/0202529 A1 | 8/2012 | Boucher et al. |
| 2012/0275792 A1* | 11/2012 | Nandiraju ........... H04L 12/2801 398/66 |
| 2013/0091267 A1 | 4/2013 | Urban et al. |
| 2013/0326083 A1 | 12/2013 | Boucher et al. |
| 2014/0026170 A1 | 1/2014 | Francisco |
| 2014/0032779 A1 | 1/2014 | Boucher et al. |
| 2014/0059155 A1 | 2/2014 | Boucher et al. |
| 2015/0055661 A1 | 2/2015 | Boucher et al. |
| 2015/0215194 A1 | 7/2015 | Urban et al. |
| 2015/0249609 A1 | 9/2015 | Boucher et al. |

FOREIGN PATENT DOCUMENTS

| | | |
|---|---|---|
| EP | 2579561 A1 | 4/2013 |
| KR | 10-2003-0087827 A | 11/2003 |
| KR | 10-2006-0033636 A | 4/2006 |
| WO | 2006/099236 A1 | 9/2006 |
| WO | 2012/043918 A1 | 4/2012 |

* cited by examiner

HOME NETWORK SIGNAL RELAY DEVICE IN ACCESS NETWORK AND HOME NETWORK SIGNAL RELAY METHOD IN ACCESS NETWORK USING SAME

CROSS-REFERENCED TO RELATED APPLICATIONS

This application is a National stage Patent Application of PCT International Patent Application No. PCT/KR2014/004462 (filed on May 19, 2014) under 35 U.S.C. §317, which claims priority to Korean Patent Application No. 10-2013-0113430 (filed on Sep. 24, 2013), the teachings of which are incorporated herein in their entireties by reference.

TECHNICAL FIELD

The present disclosure relates to a home network signal relay device and a data relay method using the same in an access network.

BACKGROUND ART

Typically, based on a very high bit rate digital subscriber line (VDSL) technology, an uplink/downlink frequency division multiplexing (FDM) scheme has been used to achieve a transmission speed of up to 100 Mbps by applying a maximum of 30 MHz frequency band.

In addition, it is difficult to achieve a maximum speed of up to 200 Mbps although a bonding or vectoring technology has applied to increase a transmission speed.

It is also difficult to reuse existing local copper wires to provide a data transmission speed of one gigabyte or more to a subscriber.

Further, excessive installation cost is involved when applying a bonding technology or switching to FTTH (Fiber to the home) to provide a speed of gigabyte or more. Since an optical subscriber network and a local copper wire section are not managed together, it is difficult to optimize transmission quality.

DISCLOSURE

Technical Problem

Embodiments of the present disclosure have been made in an effort to propose a home network signal relay device in an access network in which an optical signal of an access network can be converted into a home network signal to be transmitted to a subscriber, and a method for relaying a home network signal using the same in the access network.

Technical Solution

According to an exemplary embodiment of the present disclosure, a method may be provided for converting an optical signal into a home network signal by a home network signal relay device in an access network. The method may include: receiving an optical signal via an optical cable and converting the received optical signal to an Ethernet signal; classifying and storing the converted Ethernet signal according to a type of data; converting a frame of the stored Ethernet signal to a frame of a home network signal; and distributing the converted home network signal to at least one of relay terminals and user terminals via transmission lines.

If a plurality of data packets has the same destination, the converting may include grouping the data packets of the same destination into one data packet and converting the one data packet.

If priorities of data packets are different, the converting may include i) converting data packets having a high priority first, ii) temporarily storing data packets having a comparatively low priority, and converting the stored data packets.

If service types of data are different, the converting may include i) for a latency-critical service, increasing a priority for immediate processing and performing conversion, and ii) for a service allowing buffering, grouping streaming data to be transmitted and the grouped streaming data.

The distributing may include receiving the converted home network signal via a plurality of Tx/Rx units, switching a signal of the Tx/Rx unit depending on a data transmission speed required by one of the relay terminal and the user terminal, and matching and transmitting the switched signal according to a transmission line.

According to another exemplary embodiment of the present invention, a home network signal relay device in an access network includes: an optical-to-electrical converter configured to convert an optical signal into an Ethernet signal and to convert an Ethernet signal into an optical signal; a frame converter configured to classify and store the converted Ethernet signal according to a type of data and to convert a stored frame of the Ethernet signal to a frame of the home network signal; and a distributor configured to distribute and transmit the converted home network signal to at least one of relay terminals and user terminals.

The frame converter may include a classifier configured to classify the Ethernet signal according to the type of data, a storage unit including a plurality of buffers for temporarily storing the classified data, a scheduler configured to receive and schedule the signals stored in the plurality of buffers, and a plurality of converters configured to convert a frame of Ethernet signal into a frame of home network signal according to the scheduling.

The distributor may include a plurality of Tx/Rx units configured to receive/transmit the converted home network signal, a switching unit configured to switch signals of the plurality of Tx/Rx units depending on a data transmission speed required by at least one of the relay terminals and the user terminals, and a matching transmitter configured to match the switched signal in accordance with the transmission line to transmit it to the relay terminals or the user terminals.

The device may further include a controller that is configured to control the frame converter to schedule and convert the Ethernet signal and to synchronize the distributor to switch the signals of the plurality of Tx/Rx units.

The transmission line may include at least any one of a coaxial cable, a telephone line, or a power line.

The frame converter may convert the frame depending on a destination, a priority, or a service type of the data packet.

Advantageous Effects

According to at least one embodiment of the present disclosure, an optical signal is converted into a home network signal, and the converted signal is transmitted according to characteristics of a transmission line in a copper wire section where an access network is introduced. Accordingly, existing copper wire lines can be reused, and a system can be implemented with a comparatively low cost.

In addition, according to at least one embodiment of the present disclosure, the optimal signal is converted into the home network signal, and the home network signal is distributed according to characteristics of data traffic. Accordingly, line usage efficiency can be improved and a data transmission speed for each subscriber line can be increased.

MODE FOR INVENTION

In the following detailed description, only certain exemplary embodiments of the present disclosure have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In accordance with at least one embodiment, a home network signal relay device and a method for relaying a home network signal using the same in the access network will now be described in detail with reference to FIG. 1 to FIG. 6.

Figure 1:
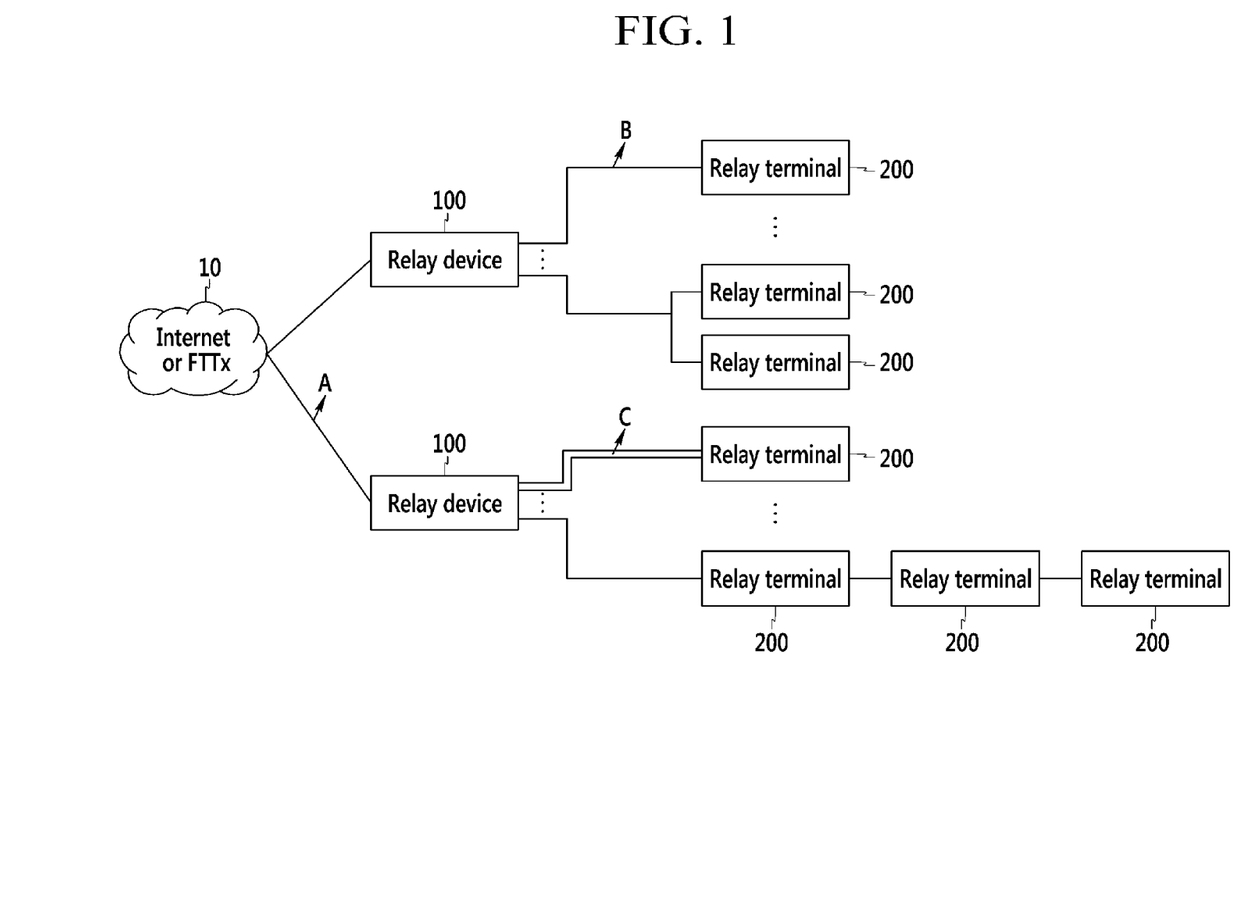
FIG. 1 is a schematic block diagram of a home network signal relay system according to an exemplary embodiment of the present disclosure.

FIG. 1 is a diagram illustrating a home network signal relay system according to an exemplary embodiment of the present disclosure. The diagram of FIG. 1 illustrates a schematic configuration for describing the home network signal relay system. Accordingly, embodiments of the present disclosure are not limited thereto.

Referring to FIG. 1, the home network signal relay system according to the embodiment includes a plurality of home network signal relay devices 100 and a plurality of relay terminal 200. Herein the plurality of home network signal relay devices 100 are connected to a central office device in a telephone office building.

In accordance with at least one embodiment, the home network relay system includes an access network for relaying a signal (or access area) and a home network (or home area). Herein, the access network relays a signal of Internet network to a plurality of home sections. In addition, the home network receives a relay signal of the access network to provide the relay signal to a service provider and a home user's user terminal (not shown).

The home network signal relay device 100 converts an optical signal received via an optical cable (A) connected to Internet network or FTTx (Fiber to the x) 10 into an Ethernet signal and converts the converted Ethernet signal into a home network signal to transmit the home network signal to the relay terminal 200.

The home network signal relay device 100 may convert the home network signal transmitted from the relay terminal 200 into an Ethernet signal. The home network signal relay device 100 may convert the converted Ethernet signal into an optical signal to transmit the optical signal to an external network via the optical cable.

The home network signal relay device 100 transmits the home network signal to the relay terminal 200 via transmission lines (B). In this case, the home network signal relay device 100 may allow one transmission line to be branched to transmit the home network signal to the plurality of relay terminals. The home network signal relay device 100 may allow a plurality of transmission lines (C) to be combined to transmit the home network signal to one relay terminal.

The plurality of relay terminals may be cascaded such that they are connected to one transmission line branched from the home network signal relay device 100. In this case, the transmission line includes at least any one of a coaxial cable, a telephone line, or a power line.

The relay terminal 200 transmits the home network signal transmitted from the home network signal relay device 100 to one or more user terminals (not shown).

In the home network signal relay system according to at least one embodiment of the present disclosure, since a G.hn technology is applied to a section via which local copper wires are introduced, the existing copper wire lines can be reused, and it is possible to implement a system that allows a maximum transmission speed of up to 1 Gbps for each subscriber line.

Now, a configuration of the home network signal relay device 100 will be described in detail with reference to FIG. 2.

Figure 2:
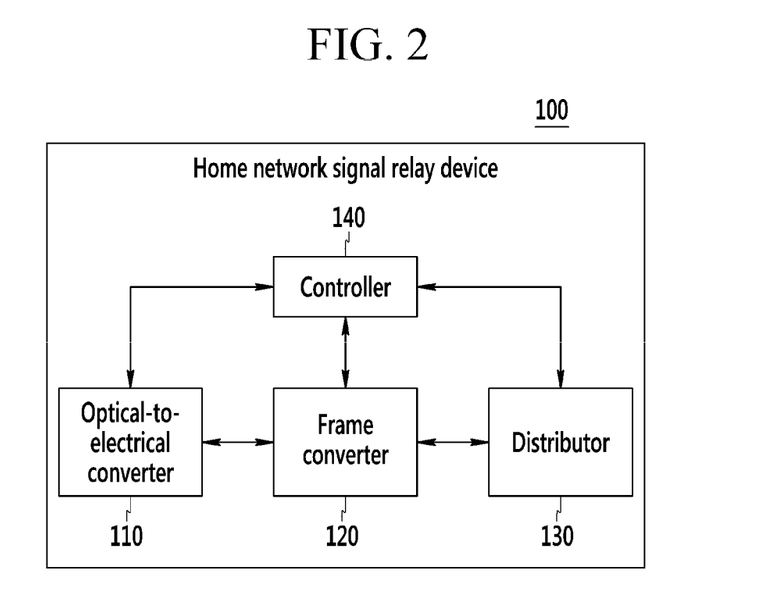
FIG. 2 is a schematic block diagram of a configuration of a home network signal relay device according to an exemplary embodiment of the present invention.

FIG. 2 is a diagram illustrating a configuration of a home network signal relay device according to an exemplary embodiment of the present disclosure. The diagram of FIG. 2 illustrates a schematic configuration for describing a home network signal relay device. However, the embodiments of the present disclosure are not limited thereto.

Referring to FIG. 2, the home network signal relay device 100 according to an embodiment of the present disclosure includes an optical-to-electrical converter 110, a frame converter 120, a distributor 130, and a controller 140.

The optical-to-electrical converter 110 receives an optical signal via an optical cable to convert the received optical signal into an Ethernet signal. The optical-to-electrical converter 110 may receive an Ethernet signal to convert the received Ethernet signal into an optical signal to output the Ethernet signal or the optical signal.

The frame converter 120 classifies the Ethernet signal converted from the optical-to-electrical converter 110 according to a type of data and converts the Ethernet signal into a home network signal.

The distributor 130 distributes and transmits the home network signal to one or more relay terminals.

The controller 140 controls the frame converter 120 to schedule and convert the Ethernet signal. The controller 140 synchronizes the distributor 130 to switch a plurality of home network signals and transmits them to the relay terminal.

A frame converter 120 and a distributor 130 will now be described in detail with reference to FIGS. 3 to 5.

Figure 3:
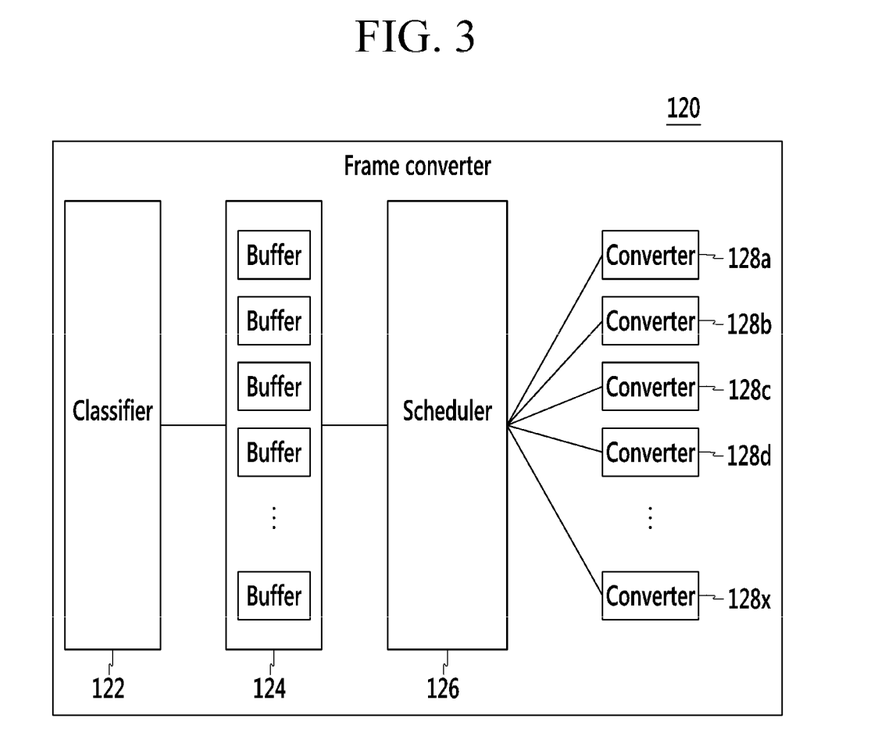
FIG. 3 is a schematic block diagram of a configuration of a frame converter according to an exemplary embodiment of the present invention.

FIG. 3 is a diagram illustrating a configuration of a frame converter according to an exemplary embodiment of the present disclosure. The diagram of FIG. 3 illustrates a schematic configuration for describing the frame converter. However, the embodiments of the present disclosure are not limited thereto.

Referring to FIG. 3, the frame converter 120 according to an embodiment of the present disclosure includes a classifier 122, a storage unit 124, a scheduler 126, and a converter 128.

The classifier 122 classifies an Ethernet signal according to a type of data. In addition, the storage unit 124 includes a plurality of buffers that temporarily stores the classified data.

That is, the frame converter 120 identifies the type of data such as an Internet signal, a TV signal, or a VOIP signal that is classified by the classifier 122, and temporarily stores the data in the buffer of the storage unit 124 according to its type.

Subsequently, the scheduler 126 receives the data stored in the plurality of buffers to schedule the data.

The converter 128 converts the Ethernet signal according to scheduling of the scheduler 126 into a home network signal.

In this case, the converter 128 converts a frame of the Ethernet signal into a frame of home network signal depending on a destination, priority, or service type of a data packet.

Figure 4:
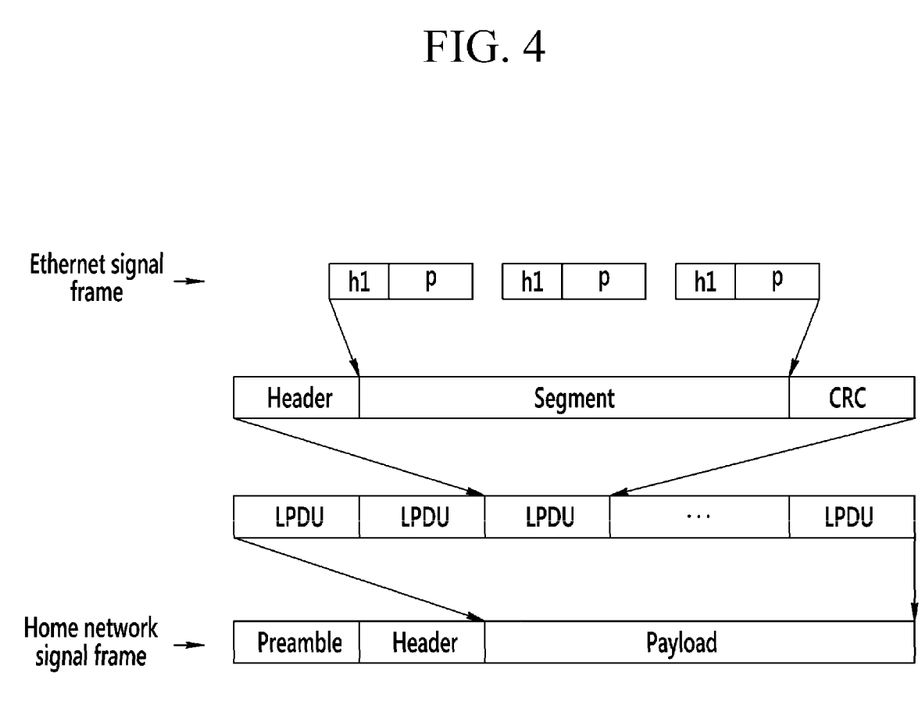
FIG. 4 illustrates an example of converting a frame of an Ethernet signal into a frame of a home network signal according to an exemplary embodiment of the present invention.

FIG. 4 exemplary illustrates converting a frame of an Ethernet signal into a frame of a home network signal according to an embodiment of the present disclosure.

As shown in FIG. 4, a plurality of data packets having the same destination or having a higher priority may be grouped into one data packet for transmission.

For example, when the plurality of data packets have the same destination, the converter 128 groups the data packets having the same destination to convert them into one data packet. Accordingly, when the scheduler 126 schedules a plurality of data packets such that they are transmitted to a destination of one subscriber (or user terminal), the frame converter 120 may group the plurality of data packets into one data packet to transmit it to the subscriber.

Accordingly, the home network signal relay device 100 according to an embodiment of the present disclosure may group the data packets having the same destination for transmission, thereby reducing processing delays associated with overhead processing and thus improving line utilization efficiency.

In addition, when priorities of the data packets are different, the converter 128 converts the data packets having a high priority first, temporarily stores the converted data packets, and converts the data packets having a low priority.

Accordingly, the home network signal relay device 100 according to an embodiment of the present disclosure schedules the data packets having a high priority first and temporarily stores the data packets having a low priority in the buffer. Then, the home network signal relay device 100 schedules and outputs the stored data packets later.

In addition, when service types of the data are different, the converter 128 may increase a priority of a latency-critical service such that it is immediately processed. For services allowing buffering for transmission, the converter 128 may group and convert streaming data to be transmitted.

For example, since VoIP is a latency-critical service, its priority is increased for immediate processing, and IPTV may group and transmit a large amount streaming data to be transmitted together using a wide bandwidth at a time since it allows buffering.

Figure 5:
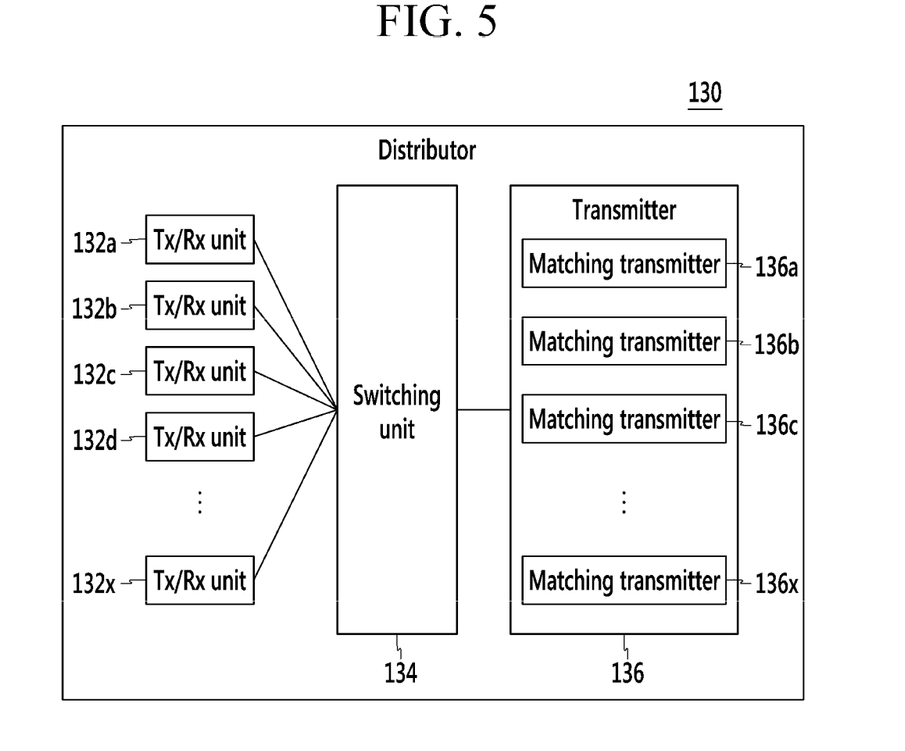
FIG. 5 is a schematic block diagram of a configuration of a distributor according to an exemplary embodiment of the present invention.

FIG. 5 is a diagram illustrating a configuration of a distributor according to an embodiment of the present disclosure. The diagram of FIG. 5 illustrates a schematic configuration for describing the distributor. Accordingly, the embodiments of the present disclosure are not limited thereto.

Referring to FIG. 5, in accordance with at least one embodiment, the distributor 130 includes a Tx/Rx unit 132, a switching unit 134, and a transmitter 136.

The Tx/Rx unit 132 receives a home network signal converted from the converter 128.

The switching unit 134 switches a plurality of home network signals received by the Tx/Rx unit 132 according to a data transmission speed required by the relay terminal. In addition, the switching unit 132 reflects various user requirements and provides an environment for connecting various topologies such as one-to-one, one-to-many, and many-to-many.

The transmitter 136 matches the switched signal according to the characteristics of the transmission line and transmits it to the relay terminal. The transmitter 136 includes a plurality of matching transmitters 136a to 136x. Such a plurality of matching transmitters 136a to 136x match and transmit the signal according to the characteristics of the transmission line in accordance with an embodiment of the present disclosure.

Now, an operation of a home network signal relay device 100 for converting an optical signal into a home network signal and distributing the converted signal will now be described in detail with reference to FIG. 6.

Figure 6:
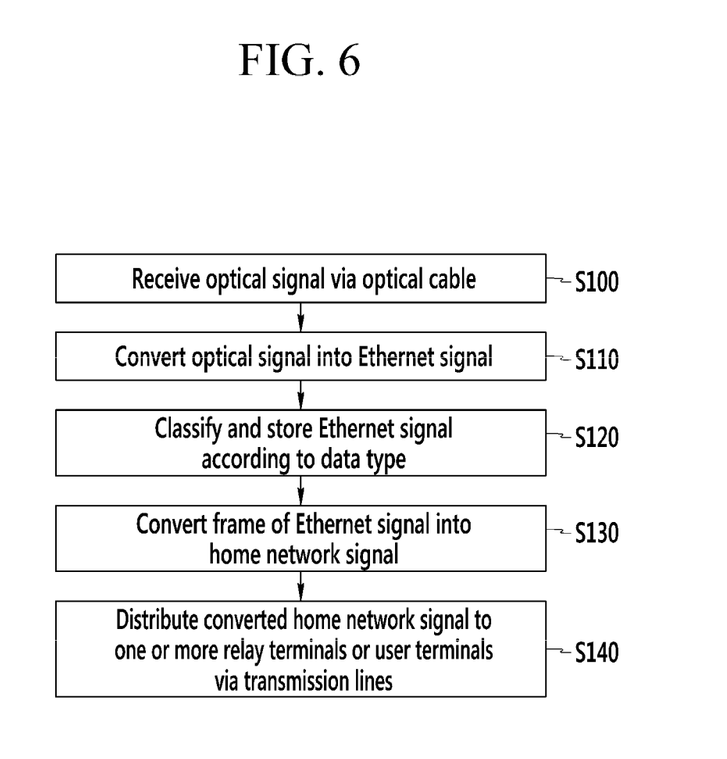
FIG. 6 is a flowchart illustrating a process of a method for relaying a home network signal according to another exemplary embodiment of the present invention.

FIG. 6 is a flowchart illustrating a method for relaying a home network signal according to an embodiment of the present disclosure. In this case, the flowchart below will be described using the same reference numerals in connection with the configurations of FIG. 1 to FIG. 4.

Referring to FIG. 6, in accordance with at least one embodiment, the home network signal relay device 100 receives an optical signal via an optical cable and converts the received optical signal into an Ethernet signal (S100 and S110).

In addition, the home network signal relay device 100 classifies the converted Ethernet signal according to a type of data and temporarily stores the Ethernet signal in a buffer (S120).

The home network signal relay device 100 converts a stored frame of the Ethernet signal into a home network signal via a frame converter 120 (S130). In this case, the frame converter 120 converts the frame in consideration of a destination, priority, or service type of a data packet.

Subsequently, a distributor 130 of the home network signal relay device 100 distributes the home network signal to one or more relay terminals 200 via transmission lines (S140). In this case, the distributor 130 may switch the signal of a Tx/Rx unit according to requirements of the relay terminal 200 and the topology. The distributor 130 may match and transmit the switched signal according to the transmission line.

As described above, the home network signal relay device according to at least one embodiment of the present disclosure may convert the optical signal directly into the home network signal in an area where local copper wires are introduced and transmit the home network signal according to the characteristics of the transmission line. Accordingly, the existing copper wire lines can be reused, and a system can be implemented with a comparatively low cost.

In addition, in accordance with at least one embodiment, the home network signal relay device converts the data packet into the home network signal according to the type before the transmission. Accordingly, line utilization efficiency can be enhanced, and the data transmission speed for each subscriber line can be increased.

The foregoing exemplary embodiments of the present invention are not implemented only by an apparatus and a method, and therefore may be realized by programs realizing functions corresponding to the configuration of the exemplary embodiment of the present invention or recording media on which the programs are recorded. Such recording media may be executed in a user terminal as well as a server.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for converting an optical signal into a home network signal and relaying the home network signal, by a home network signal relay device in an access network, the method comprising:
   receiving an optical signal via an optical cable and converting the received optical signal to an Ethernet signal;
   classifying and storing the converted Ethernet signal according to a type of data;
   converting a frame of the stored Ethernet signal to a frame of a home network signal depending on a destination, a priority, or a service type of each data packet in the Ethernet signal; and
   distributing the converted home network signal to at least one of relay terminals and user terminals via transmission lines.

2. The method of claim 1, wherein the converting includes, if a plurality of data packets have a same destination, grouping the data packets of the same destination into one data packet and converting the one data packet.

3. The method of claim 1, wherein the converting includes, if priorities of data packets are different, i) converting data packets having a comparatively higher priority first, ii) temporarily storing data packets having a comparatively low priority, and iii) converting the temporarily stored data packets later.

4. The method of claim 1, wherein the converting includes, if service types of data are different, i) for a latency-critical service, increasing a priority and immediately performing conversion, and ii) for a service allowing buffering, grouping streaming data to be transmitted and converting the grouped streaming data.

5. The method of claim 1, wherein the distributing includes:
   receiving, as the converted home network signal, a plurality of signals;
   switching each of the received signals depending on a data transmission speed required by one of the relay terminal and the user terminal; and
   matching and transmitting the switched signal according to a transmission line.

6. A home network signal relay device in an access network, comprising:
   an optical-to-electrical converter configured to convert an optical signal into an Ethernet signal and to convert an Ethernet signal into an optical signal;
   a frame converter configured to classify and store the converted Ethernet signal according to a type of data and to convert a stored frame of the Ethernet signal to a frame of the home network signal depending on a destination, a priority, or a service type of each data packet in the Ethernet signal; and
   a distributor configured to distribute and transmit the converted home network signal to at least one of relay terminals and user terminals.

7. The home network signal relay device of claim 6, wherein the frame converter includes:
   a classifier configured to classify the Ethernet signal according to the type of data;
   a storage unit including a plurality of buffers for temporarily storing the classified data;
   a scheduler configured to receive and schedule the signals stored in the plurality of buffers; and
   a plurality of converters configured to convert a frame of Ethernet signal into a frame of home network signal according to the scheduling.

8. The device of claim 7, wherein the distributor includes:
   a plurality of Tx/Rx units configured to receive/transmit the converted home network signal;
   a switching unit configured to switch signals of the plurality of Tx/Rx units depending on a data transmission speed required by one of the relay terminals and the user terminals; and
   a matching transmitter configured to match the switched signal in accordance with the transmission line to transmit it to at least one of the relay terminals and the user terminals.

9. The device of claim 8, further comprising a controller configured to control the frame converter to schedule and convert the Ethernet signal and to synchronize the distributor to switch the signals of the plurality of Tx/Rx units.

10. The device of claim 9, wherein the transmission line includes at least any one of a coaxial cable, a telephone line, and a power line.

* * * * *